(No Model.)

W. W. KRUTSCH.
BUGGY TOP ATTACHMENT.

No. 586,271. Patented July 13, 1897.

Witnesses
J. C. Shaw
Chas. E. Brock

Inventor
W. W. Krutsch,
by [Attorneys]

THE NORRIS PETERS CO., PHOTO-LITHO., WASHINGTON, D. C.

UNITED STATES PATENT OFFICE.

WILLIS W. KRUTSCH, OF COFFEYVILLE, KANSAS.

BUGGY-TOP ATTACHMENT.

SPECIFICATION forming part of Letters Patent No. 586,271, dated July 13, 1897.

Application filed November 19, 1896. Serial No. 612,759. (No model.)

*To all whom it may concern:*

Be it known that I, WILLIS W. KRUTSCH, residing at Coffeyville, in the county of Montgomery and State of Kansas, have invented a new and useful Buggy-Top Attachment, of which the following is a specification.

This invention relates generally to a buggy-top attachment, and more particularly to certain improvements upon Patent No. 550,624, granted to me December 3, 1895, and Patent No. 534,892, granted to me February 26, 1895.

The present device, as well as those patented, is for the purpose of taking the strain from the top-stays when the top of the vehicle is let down, and this has been accomplished by arranging a coil-spring about the arm of the shifting rail, which spring exerts a tension upon the top-stay. The tension of this spring could be regulated as desired. In practice I have found that the strain upon this spring is not evenly distributed, but is thrown ordinarily upon the end coils, which has then had the effect of breaking the end coil of the spring.

The object of my present invention therefore is to avoid this breaking by evenly distributing the strain along the coils of the spring; and with this object in view my invention consists, essentially, in providing both the inner and outer plates, between which the spring is confined, with inwardly-projecting flanges, the flanges snugly fitting within the end coils of the spring, and thereby transmitting the strain evenly along the entire spring.

The invention consists also in certain details of construction and novelties of combination, all of which will be fully described hereinafter and pointed out in the claims.

Figure 1:
Figure 2:
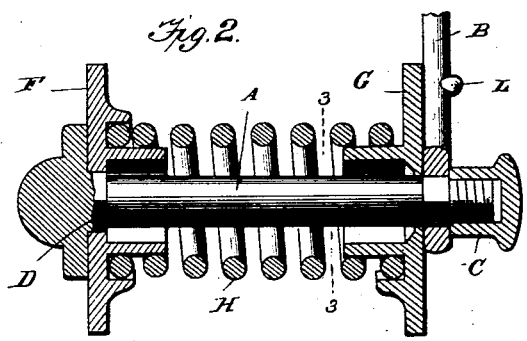
Figure 3:
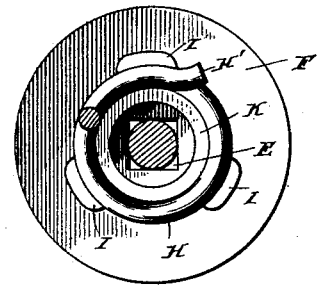
Figure 4:
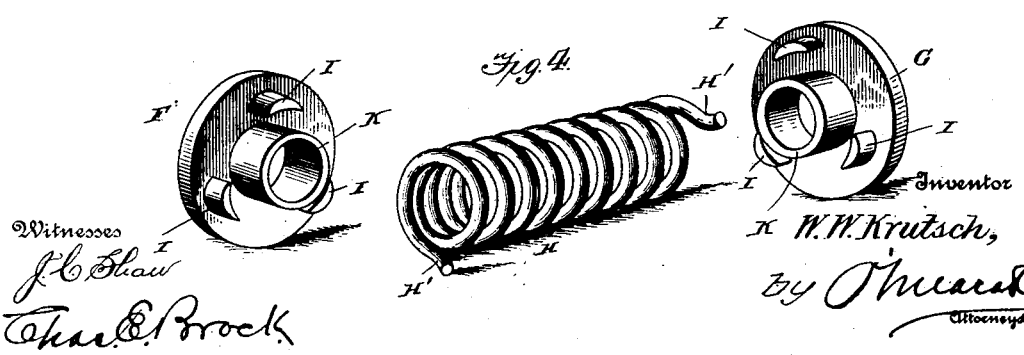

In the drawings forming a part of this specification, Figure 1 is a view showing the practical application of my invention. Fig. 2 is a vertical sectional view of the confining-plates and coil-spring, the arm or bolt to which said plates are attached being shown in elevation. Fig. 3 is a sectional view on the line 3 3 of Fig. 2. Fig. 4 is a view showing the plates and spring detached.

In the practical application of my invention I employ an arm or bolt A, which is rigidly attached to the shifting rail or side of the vehicle, and upon the outer end of said arm or bolt is arranged the top-stay B, held in place by means of a nut C.

The inner end of the bolt or arm A is formed with a polygonal shoulder D, which is adapted to fit the polygonal opening E of the circular plate F. This plate F, I prefer to designate the "inner" plate, and near the opposite end of the bolt and upon the inner side of the top-stay B is arranged a circular plate G, which I prefer to designate the "outer" plate, said outer plate having a central circular bore through which the end of the arm or bolt A freely passes.

Surrounding the bolt or arm A between the inner and outer plates is a stout coil-spring H, the ends H' being secured beneath the lugs I, cast integral upon the opposing faces of the inner and outer plates F and G, and also integral with the said plates are the sleeves or collars K, which project inwardly toward each other and snugly fit the end coils of the spring, and thereby securely hold the ends of the spring in place beneath the lug.

A series of lugs are provided in order that the tension of the spring may be regulated as desired.

The outer plate G has a finger or hook L integral with the outer face which engages the top-stay B and holds the same in proper position with relation to the outer plate G.

In operation the parts are assembled as shown in Figs. 1 and 2, and when the top is thrown back the spring will be subjected to a tension, and the strain, which will ordinarily be thrown upon the top-stays, is taken up by the said spring. This result I have accomplished by the attachment covered by the patents previously referred to. The essential feature of the present invention, however, is the formation of the inner and outer plates, inasmuch as they are provided with inwardly-projecting sleeves or collars which snugly fit into the end coils of the tension-spring and thereby cause the strain, which has heretofore been thrown entirely upon the end coils, to be distributed evenly from each end toward the center of the spring, thereby subjecting the entire spring to a gradual and uniform tension and avoiding any breakage of the said spring. It will thus be seen that I provide an exceedingly cheap and simple attachment, which will carry out all of the objects for which it is intended.

Having thus described my invention, what I claim as new, and desire to secure by Letters Patent, is—

1. In a buggy attachment, the combination with the bolt or arm, of the inner and outer plates arranged thereon, the coil-spring arranged between the said plates and connected therewith, and the inwardly-projecting sleeves or collars arranged at opposite ends of the said spring, substantially as shown and described.

2. In a buggy attachment, the combination with the bolt or arm, of the inner plate rigidly attached thereto, the outer plate movable upon the said bolt or arm, said inner and outer plates having inwardly-projecting sleeves or collars and having lugs upon their opposing faces, and a coil-spring adapted to engage the lugs and surround the sleeves or collars, substantially as shown and described.

3. In a buggy attachment, the combination with the bolt or arm, of the inner plate rigidly mounted thereon and having the inwardly-projecting sleeve or collar, and the stop-lugs upon the inner face, and the hook or finger upon the outer face, the top-stay, and securing-nut, all arranged and adapted to operate, substantially as shown and described.

4. A buggy attachment, the inner plate having the polygonal-shaped aperture, the inwardly-projecting collar or sleeve surrounding the said polygonal-shaped aperture, and the stop-lugs integral with the inner face, substantially as shown and described.

5. In a buggy attachment, the outer plate having a central circular bore, the inwardly-projecting sleeve or collar surrounding the said bore, the stop-lugs integral with the inner face of the plate, and the hook or finger integral with the outer face of the plate, all of said parts being arranged and adapted to operate, substantially as shown and described.

WILLIS W. KRUTSCH.

Witnesses:
CHAS. E. BROCK,
JAS. L. CRAWFORD.